April 30, 1940.  E. B. MOSS  2,199,290
GYROSCOPIC TURN INDICATOR FOR AIRCRAFT
Filed Feb. 6, 1939
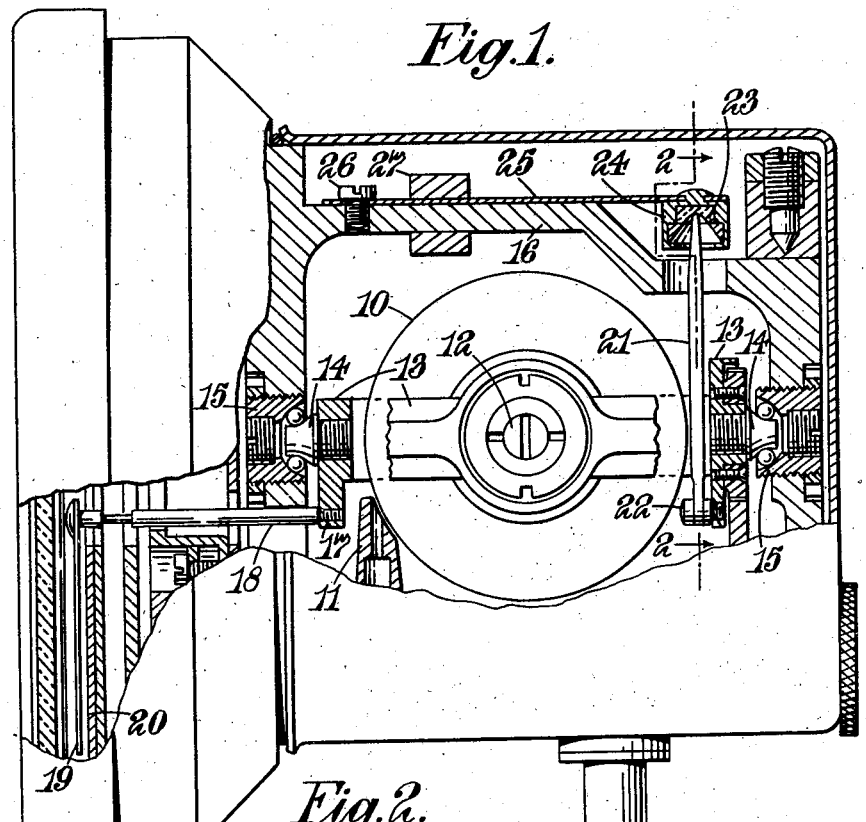
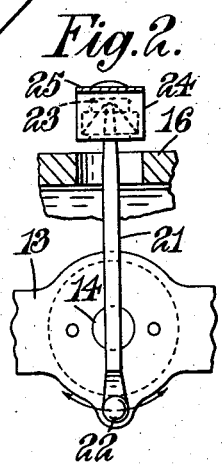
Inventor:
Eric Beecroft Moss,
By Stebbins, Blenko & Parmelee,
attys.

Patented Apr. 30, 1940

2,199,290

UNITED STATES PATENT OFFICE 2,199,290

GYROSCOPIC TURN INDICATOR FOR AIRCRAFT

Eric Beecroft Moss, Cricklewood, London, England, assignor to S. Smith & Sons (Motor Accessories), Limited, Cricklewood, London, England, a company of Great Britain Application February 6, 1939, Serial No. 254,947
In Great Britain February 9, 1938

5 Claims. (Cl. 33—204)

This invention relates to gyroscopic turn indicators for aircraft. The invention is concerned with such turn indicators of the kind in which the rotor is journalled in a frame which is itself journalled for rotation about an axis perpendicular to that of the rotor, both axes being perpendicular to the axis about which the turn is to be indicated, and a pointer, or like indicating means, being operated by the movements of the frame due to the precessional forces set up by the rotor as a result of the turning movement of the indicator.

In such indicators it is necessary to provide means for restoring the frame to its initial position after a turn has been completed, and the restoring force should increase as the angular movement of the frame from its initial position increases, for instance, such that a uniformly graduated scale may be used.

In a known construction the restoring means consists of a coiled spring hooked on to the frame at a point offset from its axis of rotation and so arranged that the spring is extended by angular movement of the frame in either direction from its initial position. This arrangement has the disadvantage that friction is introduced at the point of connection of the spring to the frame with the result that the frame is not fully restored. A further disadvantage is that a very short spring has to be used in order to avoid increasing the size of the instrument unduly because the spring must extend in a direction perpendicular to the axis of the frame.

An object of the invention is to provide improved restoring means to overcome the aforesaid disadvantages, and the invention comprises a gyroscopic turn indicator of the kind referred to, wherein the restoring means comprises a leaf-spring supported at one end, and means on the frame engaging with the free end of this spring.

According to a feature of the invention the leaf-spring is arranged for movement of the free end towards and away from the rotational axis of the frame by reason of the resiliency of the spring, and an operating member is provided connecting the free end of the spring to the frame at a point offset from its axis.

In a preferred construction, the spring is arranged at one side of the axis of rotation of the frame and the operating member is connected to the frame at the opposite side of its axis so that this operating member operates in compression due to the spring. In a convenient construction, the spring is arranged parallel with the axis of the frame.

One specific construction of gyroscopic turn indicator according to the invention is shown by way of example in the accompanying drawing, in which:

Figure 1 is a sectional elevation of the instrument, and

Figure 2 is a detail view, being a section on line 2—2 of Figure 1.

Referring to the drawing, the instrument comprises a rotor 10, driven in any convenient manner, for instance by a current of air delivered by a nozzle 11 and impinging on the periphery of the rotor. The rotor is mounted in bearings, one of which is indicated at 12, in a frame 13 surrounding the rotor. This frame has journals 14 by means of which it is rotatably mounted in bearings 15 in a casing 16 of the instrument, about an axis perpendicular to that of the rotor. The frame has an arm 17 carrying a rod 18 to which is attached a pointer 19 positioned in front of a dial 20. The instrument is positioned with the rotor axis transversely of the aircraft so that a turning movement of the aircraft causes rotation of the frame in one or other direction from the normal horizontal position as shown.

A restoring force provided by a spring is applied to the frame through an operating member consisting of a rod 21 which is hinged at 22 to the frame adjacent to but below one of the journals 14 thereof. This rod extends upwards and passes in front of the journal of the frame, or if necessary may be curved to pass around this journal. At its upper end the rod is pointed and engages in a jewel 23 mounted in a holder 24 attached to one end of a leaf-spring 25 positioned above the rotor. The spring extends in a direction substantially parallel to the axis of rotation of the frame and it is rigidly attached to the casing 16 at its other end by means of a screw 26. In a modified construction, the hinged joint aforesaid is replaced by a jewelled bearing.

In operation of the indicator, the angular movement of the frame in either direction from its initial horizontal position results in the hinge 22 moving upwards so that the free end of the leaf-spring is deflected by means of the rod. The restoring force applied to the frame through the rod by means of the spring thus increases as the angular movement of the frame from its initial position increases. A slide 27 embracing the spring and part of the casing 16 and slidable lengthwise of the spring may be employed for varying the restoring force.

By means of the construction according to this invention, there is practically no friction at the joints of the restoring means, and moreover, since the spring extends in the direction of the frame axis a comparatively long leaf-spring can be used without detracting from the compactness of the instrument.

I claim:

1. A gyroscopic turn indicator comprising a rotor, a frame in which said rotor is rotatably mounted, means supporting said frame for rotation about an axis perpendicular to that of the rotor axis, indicating means operated by movement of the frame and restoring means for the frame comprising a leaf-spring arranged at a position displaced laterally to one side of the axis of the said frame, which spring is fixedly supported at one end and is free at the other end for movement towards the axis of the frame, and an operating member engaging with the free end of the spring and with the frame at a point situated at the side of its axis opposite said spring and thus operating under compression due to the action of the spring.

2. A gyroscopic turn indicator comprising a rotor, a frame in which said rotor is rotatably mounted, means supporting said frame for rotation about an axis perpendicular to that of the rotor axis, indicating means operated by movement of the frame, restoring means for the frame comprising a leaf-spring having one end fixed and arranged substantially parallel with the axis of the frame and a member in which the free end of the leaf-spring bears, which member in turn bears upon the said frame at a point which is offset from its axis in the direction remote from said leaf-spring.

3. A gyroscopic turn indicator comprising a rotor, a frame in which said rotor is rotatably mounted, means supporting said frame for rotation about an axis perpendicular to that of the rotor axis, indicating means operated by movement of the frame, restoring means for the frame comprising a leaf-spring arranged at a position displaced laterally to one side of the axis of the said frame, which spring is fixedly suupported at one end and is free at the other end for movement towards and away from the axis of the frame, a compression rod engaging at its ends respectively with the free end of the spring and with the frame at a point situated at the opposite side of the axis of said frame, and a jewelled bearing for at least one end of said rod.

4. A gyroscopic turn indicator comprising a rotor, a frame in which said rotor is rotatably mounted, means supporting said frame for rotation about an axis perpendicular to that of the rotor axis, indicating means operated by movement of the frame, restoring means for the frame comprising a leaf-spring arranged at a position displaced laterally to one side of the axis of the said frame, which spring is fixedly supported at one end and is free at the other end for movement towards and away from the axis of the frame, a compression rod engaging at its ends respectively with the free end of the spring and with the frame at a point situated at the opposite side of the axis of said frame, and for at least one end of said rod a recessed bearing in which the end of the rod rests.

5. A gyroscopic turn indicator comprising a rotor, a frame in which said rotor is rotatably mounted, means supporting said frame for rotation about an axis perpendicular to that of the rotor axis, indicating means operated by movement of the frame, restoring means for the frame comprising a leaf-spring arranged at a position displaced laterally to one side of the axis of the said frame, which spring is fixedly supported at one end and is free at the other end for movement towards the axis of the frame, and an operating member engaging with the free end of the spring and with the frame at a point situated at the opposite side of its axis from said spring and operating under compression due to the action of the spring, and means for adjusting the effective length of the leaf-spring to vary the restoring force.

ERIC BEECROFT MOSS.